Patented May 5, 1931

1,804,183

UNITED STATES PATENT OFFICE

WILLY SECK, OF AUGSBURG, GERMANY, ASSIGNOR TO ERBA AKTIENGESELLSCHAFT, OF ZURICH, SWITZERLAND

MANUFACTURE OF HIGHLY SULPHONATED OILS

No Drawing. Application filed February 3, 1928, Serial No. 251,738, and in Germany June 23, 1927.

The object of the invention is a process for preparing highly sulphonated oils, especially those stable towards magnesia and lime. My invention is intended to be utilized for sulphonating oils and fats of animal and plant origin. Hence whenever I refer to oil, it is understood that I refer to an oil or fat or fatty acid of animal or plant origin.

It has been found that the sulphonation process can be favourably influenced and the sulphuric acid absorption of an oil considerably increased by carrying out the sulphonation in the presence of peroxides, such as hydrogen peroxide, alkali or alkaline earth peroxides, or in the presence of such substances as are capable of giving off active oxygen in acid solution, especially per-compounds, such as per-sulpho acids, alkali persulphates, alkali percarbonates, alkali perborates, peroxides of organic acids (such as acetyl peroxide and benzoyl peroxide), compounds of hydrogen peroxide with organic bodies, such as benzoic acid, and urea. Thus, for example, by acting on 100 parts by weight of castor oil with 25 parts by weight of concentrated sulphuric acid in the presence of such a quantity of any of the above-mentioned compounds as will give off about 0.5–1% of active oxygen calculated on the quantity of oil, a highly sulphonated oil is obtained, which, after neutralization, for example, with free alkalies or alkali carbonates, yields an extremely valuable product, especially in regard to its stability towards lime and magnesia, and one which could not be prepared by sulphonation with sulphuric acid according to the hitherto known methods.

A bleaching action can also be effected by employing a suitable quantity of the peroxide, for example, such as will evolve 3 or more per cent of active oxygen.

It has been further found that acid oils prepared in this way are preferably not washed, but directly neutralized without washing, the sulphates thus formed being thrown out of solution by the addition of water-soluble alcohols such as ethyl alcohol, methyl alcohol and isopropyl alcohol. The alcohol, a relatively small quantity of which will suffice, can be added before, during, or after the neutralization process.

It has further been found that the neutralization process described can also with advantage be extended to other sulphonated oils, provided the latter are present in a reaction mixture which has a high content of sulphonated oils and only a small quantity of free sulphuric acid. All sulphonating processes come into this category. In this case also oil preparations practically free from alkali sulphate can be obtained, which are characterized by their higher degree of sulphonation and consequently increased stability towards lime and magnesia in contradistinction to such products which are washed before the neutralization process according to the methods hitherto employed.

The following example illustrates one method of carrying the invention into effect:—

To 100 kgms. of oil are added 3 kgms. of 30% hydrogen peroxide stabilized with phosphoric acid, (or a corresponding quantity of sodium, potassium or ammonium persulphate, percarbonate, or perborate or any of the other substances mentioned above), preferably in portions, and sulphonated with 25 kgms. of concentrated sulphuric acid (96–98%) for 4 hours. The reaction temperature is preferably not maintained too high. The reaction can be carried out at about 70–80° C.; deviations from this temperature range do not, however, seriously affect the resulting product. After completion of the sulphonation process the reaction mixture is treated with the quantity of alkali (sodium hydroxide or sodium carbonate) required to neutralize the free sulphuric acid present, the temperature of neutralization preferably not exceeding 25° C. and being with advantage kept below this temperature by cooling. After, during or before the neutralization process, 10 litres of ethyl (or methyl or isopropyl) alcohol are added to the aforementioned quantity, and after the separation of the salt the clear oil is filtered off from the deposited crystals.

The improved process produces a new product, namely, a sulphonated and oxidized oil which is stable towards lime and magnesia. The claim for the product is not to be restricted to the specific process above mentioned.

Tests have shown that oils simultaneously treated with hydrogen peroxide and with concentrated sulphuric acid are simultaneously sulphonated and oxidized, and the compounds so produced are, it is thought, novel.

Comparisons were made in the sulphonation of castor oil with and without peroxide. The sulphonated oil which had been subjected to the action of sulphuric acid plus a peroxide showed an equivalent weight of 1077. The ordinary sulphonated oil showed an equivalent weight of 1342. Other characteristics are also different in the sulphonated oil which was at the same time oxidized, the oxidized sulphonated oil having a lower iodine number than the ordinary sulphonated oil.

What I claim is:—

1. A process for preparing a highly sulphonated oil consisting of subjecting the oil to sulphonation in the presence of free sulphonating acid and a substance capable of evolving oxygen in acid solution.

2. A process for preparing a highly sulphonated oil consisting of subjecting the oil to sulphonation in the presence of free sulphonating acid and per-compounds capable of evolving oxygen in acid solution.

3. In a process for preparing a highly sulphonated oil in which said sulphonated oil is obtained in an acid reaction mixture containing small quantities of free sulphuric acid, the steps of neutralizing said free sulphuric acid after sulphonation without previous washing and precipitating the sulphate formed by the addition of a water soluble alcohol.

4. A process for preparing a highly sulphonated oil consisting of subjecting the oil to sulphonation in the presence of free sulphonating acid and a substance capable of evolving oxygen in acid solution, neutralizing any small excess of free sulphuric acid present in said sulphonated oil in the reaction mixture, and precipitating the sulphate formed by the addition of a water soluble alcohol.

5. A process for preparing a highly sulphonated oil consisting of subjecting the oil to sulphonation in the presence of free sulphuric acid and peroxides capable of evolving oxygen in acid solution.

In testimony whereof I hereunto affix my signature.

WILLY SECK.